United States Patent
Nainar et al.

(10) Patent No.: US 11,005,756 B2
(45) Date of Patent: May 11, 2021

(54) SIGNALING AMONG ENTITIES OF A VIRTUALIZED PACKET PROCESSING APPARATUS USING IN-BAND OPERATIONS DATA INCLUDED IN PACKETS BEING PROCESSED

(71) Applicant: Cisco Technology, Inc., San Jose, CA (US)

(72) Inventors: Nagendra Kumar Nainar, Morrisville, NC (US); Carlos M. Pignataro, Cary, NC (US); Frank Brockners, Cologne (DE); Shwetha Subray Bhandari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/231,197

(22) Filed: Dec. 21, 2018

(65) Prior Publication Data

US 2020/0153734 A1 May 14, 2020

(30) Foreign Application Priority Data

Nov. 8, 2018 (IN) .............................. 201841042129

(51) Int. Cl.
*H04L 12/715* (2013.01)
*H04L 12/741* (2013.01)
(Continued)

(52) U.S. Cl.
CPC .............. *H04L 45/64* (2013.01); *H04L 12/56* (2013.01); *H04L 45/586* (2013.01);
(Continued)

(58) Field of Classification Search
USPC ........................................................ 709/238
See application file for complete search history.

(56) References Cited

U.S. PATENT DOCUMENTS 9,674,088 B1 * 6/2017 Sivaramakrishnan .. H04L 45/38
9,992,056 B2 6/2018 Ward et al.
(Continued)

OTHER PUBLICATIONS

Gray and Nadeau, "the Virtualization Layer—Performance, Packaging, and NFV," 2016, Network Function Virtualization, Chapter 7, pp. 155-189, Elsevier B.V., Amsterdam, The Netherlands.
(Continued)

*Primary Examiner* — Hermon Asres
(74) *Attorney, Agent, or Firm* — The Law Office of Kirk D. Williams

(57) ABSTRACT

In one embodiment, in-band operations data included in packets being processed is used to signal among entities of a virtualized packet processing apparatus. Using in-band operations data provides insight on actual entities used in processing of the packet within the virtualized packet processing apparatus. The operations data in the packet is modified to signal a detected overload condition of an entity that participates in communicating the packet within the virtualized packet processing apparatus and/or applying a network service to the packet. An In-Situ Operations, Administration, and Maintenance (IOAM) header is used in one embodiment, with the IOAM header typically including a new Overload Flag to signal the detection of the overload condition. In response to the signaled overload condition, a load balancer is adjusted such that future packets are not distributed to the virtualized entity associated with the detected overload condition.

12 Claims, 9 Drawing Sheets

(51) Int. Cl.
    *H04L 12/801*     (2013.01)
    *H04L 12/54*     (2013.01)
    *H04L 12/713*     (2013.01)
    *H04L 12/803*     (2013.01)
    *H04L 12/70*     (2013.01)
(52) U.S. Cl.
    CPC ............ *H04L 45/745* (2013.01); *H04L 47/11* (2013.01); *H04L 47/125* (2013.01); *H04L 2012/5625* (2013.01)

(56) References Cited

U.S. PATENT DOCUMENTS

| | | | | |
|---|---|---|---|---|
| 2016/0249248 | A1* | 8/2016 | Ronneke | H04W 12/0802 |
| 2016/0315819 | A1 | 10/2016 | Dara et al. | |
| 2016/0315850 | A1 | 10/2016 | Dara et al. | |
| 2016/0315921 | A1 | 10/2016 | Dara et al. | |
| 2017/0111233 | A1* | 4/2017 | Kokkula | H04L 41/0823 |
| 2017/0339072 | A1 | 11/2017 | Pignataro et al. | |
| 2018/0331933 | A1* | 11/2018 | Song | H04L 29/0653 |

OTHER PUBLICATIONS

Deering et al., "Internet Protocol, Version 6 (IPv6) Specification," Dec. 1998, RFC 2460, The Internet Society, Reston, VA, USA (thirty-nine pages).

Deering et al., "Internet Protocol, Version 6 (IPv6) Specification," Jul. 2017, RFC 8200, The Internet Society, Reston, VA, USA (forty-two pages).

Carpenter et al., "Transmission and Processing of IPv6 Extension Headers," Dec. 2013, RFC 7045, The Internet Society, Reston, VA, USA (ten pages).

Elkins et al., "IPv6 Performance and Diagnostic Metrics (PDM) Destination Option," Sep. 2017, RFC 8250, The Internet Society, Reston, VA, USA (thirty pages).

Brockners et al., "Requirements for In-situ OAM," Mar. 13, 2017, draft-brockners-inband-oam-requirements-03, The Internet Society, Reston, VA, USA (twenty-four pages).

Brockners et al., "Data Fields for In-situ OAM," Jul. 2, 2017, draft-brockners-inband-oam-data-07, The Internet Society, Reston, VA, USA (twenty-nine pages).

Brockners et al., "Encapsulations for In-situ OAM Data," Jul. 2, 2017, draft-brockners-inband-oam-transport-05, The Internet Society, Reston, VA, USA (thirty pages).

BROCKNERS et al., "Geneve encapsulation for In-situ OAM Data," Jun. 27, 2018, draft-brockners-ippm-ioam-geneve-01, The Internet Society, Reston, VA, USA (ten pages).

Brockners et al., "VXLAN-GPE Encapsulation for In-situ OAM Data," Jun. 27, 2018, draft-brockners-ippm-ioam-vxlan-gpe-01, The Internet Society, Reston, VA, USA (ten pages).

Brockners et al., "Data Fields for In-situ OAM," Oct. 30, 2017, draft-ietf-ippm-ioam-data-01, The Internet Society, Reston, VA, USA (twenty-nine pages).

Brockners et al., "Data Fields for In-situ OAM," Jun. 27, 2018, draft-ietf-ippm-ioam-data-03, The Internet Society, Reston, VA, USA (thirty-five pages).

Song and Zhou, "In-situ OAM Data Type Extension," Apr. 16, 2018, draft-song-ippm-ioam-data-extension-01, The Internet Society, Reston, VA, USA (seven pages).

Bhandari et al., "In-situ OAM IPv6 Options," Jun. 29, 2018, draft-ioametal-ippm-6man-ioam-ipv6-options-00, The Internet Society, Reston, VA, USA (nine pages).

Weis et al., "GRE Encapsulation for In-situ OAM Data," Mar. 3, 2018, draft-weis-ippm-ioam-gre-00, The Internet Society, Reston, VA, USA (nine pages).

Ali et al., "Operations, Administration, and Maintenance (OAM) in Segment Routing Networks with IPv6 Data plane (SRv6)," Jul. 2, 2018, draft-ali-spring-srv6-oam-01.txt, The Internet Society, Reston, VA, USA (twenty-eight pages).

Previdi et al., "IPv6 Segment Routing Header (SRH)," Mar. 13, 2017, draft-ietf-6man-segment-routing-header-06, The Internet Society, Reston, VA, USA (thirty-five pages).

Baker and Bonica, "IPv6 Hop-by-Hop Options Extension Header," Mar. 16, 2016, draft-ietf-6man-hbh-header-handling-03, The Internet Society, Reston, VA, USA (ten pages).

Filsfils et al, "IPv6 Segment Routing Header (SRH)," Jun. 28, 2018, draft-ietf-6man-segment-routing-header-14, The Internet Society, Reston, VA, USA (twenty-nine pages).

"In-band OAM for IPv6," IPv6 Network Management Configuration Guide, Cisco IOS Release 15M&T, Jan. 26, 2018, Cisco Systems, Inc., San Jose, CA (thirty-six pages).

IPv6 Network Management Configuration Guide, Cisco IOS Release 15M&T, Nov. 21, 2012, Cisco Systems, Inc., San Jose, CA (ninety-six pages).

"Encapsulation Techniques: Generic Network Virtualization Encapsulation, VXLAN Generic Protocol Extension, and Network Service Header," White Paper, 2014, Cisco Systems, Inc., San Jose, CA (three pages).

Tom Herbert, "Re: [nvo3] [ippm] [Int-area] encapsulation of IOAM data in various protocols—follow up from WG discussion in London," Apr. 12, 2018, www.mail-archive.com/nvo3@ietf.org/msg05579.html, The Internet Society, Reston, VA, USA (six pages).

Mahalingam et al., "Virtual eXtensible Local Area Network (VXLAN): A Framework for Overlaying Virtualized Layer 2 Networks over Layer 3 Networks," Aug. 2014, RFC 7348, The Internet Society, Reston, VA, USA (twenty-two pages).

Sajassi et al., "BGP MPLS-Based Ethernet VPN," Feb. 2015, RFC 7432, The Internet Society, Reston, VA, USA (fifty-six pages).

J. Touch, "Recommendations on Using Assigned Transport Port Numbers," Aug. 2015, RFC 7605, The Internet Society, Reston, VA, USA (twenty-four pages).

Maino et al., "Generic Protocol Extension for VXLAN," Apr. 30, 2018, draft-ietf-nvo3-vxlan-gpe-06, The Internet Society, Reston, VA, USA (seventeen pages).

"Cisco Data Center Spine-and-Leaf Architecture: Design Overview," White Paper, 2016, Cisco Systems, Inc., San Jose, CA (twenty-seven pages).

Halpern and Pignataro, "Service Function Chaining (SFC) Architecture," Oct. 2015, RFC 7665, The Internet Society, Reston, VA, USA (thirty-two pages).

Qinn et al., "Network Service Header (NSH)," Jan. 2018, Jan. 2018, RFC 8300, The Internet Society, Reston, VA, USA (forty pages).

Guichard et al., "NSH and Segment Routing Integration for Service Function Chaining (SFC)," Jun. 18, 2018, draft-guichard-sfc-nsh-sr-02, The Internet Society, Reston, VA, USA (fifteen pages).

Kumar et al., "Service Function Simple Offloads," Apr. 2, 2017, draft-ietf-sfc-offloads-00, The Internet Society, Reston, VA, USA (seventeen pages).

"Internet Protocol," Sep. 1981, RFC 791, The Internet Society, Reston, VA, USA (forty-five pages).

Farinacci et al., "Generic Routing Encapsulation (GRE)," Mar. 2000, RFC 2784, The Internet Society, Reston, VA, USA (nine pages).

Brockners et al., "Proof of Transit," Oct. 30, 2016, draft-brockners-proof-of-transit-02, The Internet Society, Reston, VA, USA (twenty-three pages).

Brockners et al., "Proof of Transit," May 7, 2018, draft-brockners-proof-of-transit-05, The Internet Society, Reston, VA, USA (twenty-three pages).

Brockners et al., "Proof of Transit," Oct. 1, 2018, draft-ietf-sfc-proof-of-transit-01, The Internet Society, Reston, VA, USA (twenty-five pages).

\* cited by examiner

US 11,005,756 B2

SIGNALING AMONG ENTITIES OF A VIRTUALIZED PACKET PROCESSING APPARATUS USING IN-BAND OPERATIONS DATA INCLUDED IN PACKETS BEING PROCESSED

TECHNICAL FIELD

The present disclosure relates generally to packet switching network communications, including, but not limited to, modifying packet processing in a virtualized packet processing in response to operations data included in packets being processed.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
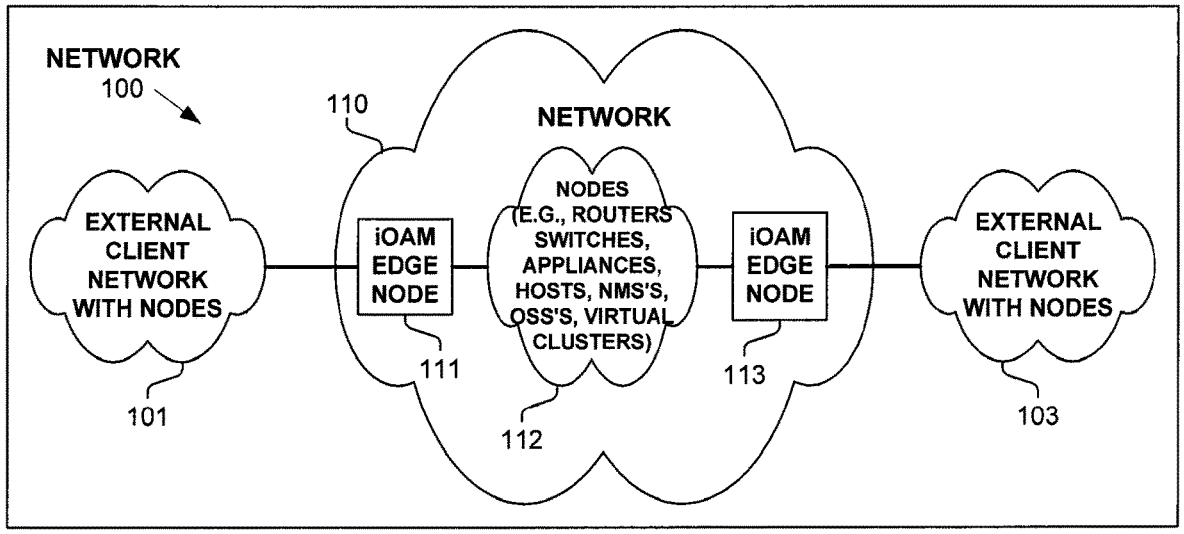
FIG. 1A illustrates a network operating according to one embodiment.

Disclosed are, inter alia, methods, apparatus, computer-storage media, mechanisms, and means associated with signaling among entities of a virtualized packet processing apparatus using in-band operations data included in packets being processed.

One embodiment includes a method, comprising: after receiving a particular packet by a particular virtual entity of a virtual packet processing apparatus, the particular virtual entity adding an operations header to the particular packet; receiving, by a second virtual entity of the packet processing apparatus, the particular packet with said operations header; modifying, by the second virtual entity, said operations header to indicate an overload condition of a corresponding overloaded virtual entity; in response to said indicated overload condition, adjusting the packet processing apparatus to avoid sending packets to said corresponding overloaded virtual entity; after receiving the particular packet with said operations header indication the overload condition, the particular virtual entity forwarding the particular packet with the operations header removed.

One embodiment includes a method, comprising: processing a particular packet in a virtual packet processing apparatus in a virtualization and container environment, with said processing including communicating the particular packet through a first ingress path to a first Pod through a first egress path; wherein the virtual packet processing apparatus includes a virtual forwarder and a first network node, with the first network node including an Ingress, a fabric, and the first Pod and a second Pod, with each of the first and second Pods including a network application container that applies a network service to packets; wherein the first ingress path includes traversing from the virtual forwarder through Ingress to the fabric to the first Pod; wherein the first egress path includes traversing from the first Pod through the fabric to the Ingress to the virtual forwarder; wherein said communicating the particular packet through the first ingress path includes: the virtual forwarder or the Ingress adding an operations header to the particular packet, and the first Pod receiving the particular packet that includes the operations header.

In one embodiment, subsequent to said receiving the particular packet, the first Pod modifies the operations header to signal an overload condition associated with the first Pod; and wherein said communicating the particular packet through the first egress path includes: the Ingress or the virtual forwarder initiating modification of the fabric to avoid sending packets to the first Pod for application of the network service.

In one embodiment, the virtual packet processing apparatus comprises a second network node that applies the network service to packets; where an entity of the first network node modifies the operations header to signal an overload condition associated with the first network node; and wherein said communicating the particular packet through the first egress path includes: the Ingress or the virtual forwarder initiating modification of the virtual forwarder to avoid sending packets to the first network node for application of the network service.

One embodiment performs a method, comprising: processing a first plurality of packets in a virtual packet processing apparatus in a virtualization and container environment, with said processing including a virtual forwarder distributing the plurality of packets between a plurality of network nodes for application of a network service, with the plurality of network nodes including a first network node and a second network; and subsequent to said processing of the first plurality of packets and detecting an overload condition of the first network node: the virtual forwarder receiving a particular packet that includes an operations header, the virtual forwarder initiating modification of the virtual forwarder to avoid said distributing packets to the first network node for application of the network service, and sending from the virtual packet processing apparatus the particular packet with a modified source address being an address of the virtual forwarder and a modified destination address being a source address of the particular packet with said received by the virtual forwarder.

In one embodiment, said operations header is an In-Situ Operations, Administration, and Maintenance (IOAM) header. In one embodiment, the IOAM header includes an Overload Flag; and wherein said modifying the operations header to indicate an overload condition includes setting or clearing the Overload Flag. In one embodiment, the IOAM header include an operations data field used to communicate additional details of the overload condition.

2. Example Embodiments

Disclosed are, inter alia, methods, apparatus, computer-storage media, mechanisms, and means associated with signaling among entities of a virtualized packet processing apparatus using in-band operations data included in packets being processed. Using in-band operations data to signal a detected overload condition provides insight on actual entities used in processing of the packet within the virtualized packet processing apparatus.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

As used herein, a "data packet" refers to a standard packet communicating information (such as a customer data packet), with a probe packet (e.g., test packet) not being included in the definition of a data packet.

As used herein, "operations data" refers to operations, administration, maintenance (OAM) and/or provisioning (OAM-P) information (e.g., including operational and telemetry information), such as, but not limited to, in-band OAM data, or more specifically, In-Situ OAM (IOAM) data. In one embodiment, the operations data is raw data, processed data, and/or data resulting from processing of other information.

In one embodiment, the operations data is related to data-plane and/or control-plane processing by one or more nodes in a network (e.g., in a portion of, or the entire network). In one embodiment, the operations data is related to communication (including, but not limited to, verifying and/or discovering a path taken and/or performance measurement data or results) and/or other processing of packet (s) in a network. In one embodiment, the operations data is related to virtual entities (e.g., instances, containers, PODs, services) of a virtualized packet processing apparatus, process(es), hardware, link(s), and/or other resources of one or more elements in the network (e.g., node(s), router(s), packet switching device(s), network management or other control system(s), host(s), server(s), apparatus, application processor(s), service devices(s), application processor(s), transmission and/or communications equipment). In one embodiment, operations data includes information related to the processing of a packet and/or entities that are used in the processing of packets by a virtualized or non-virtualized packet switching device.

FIG. 1A illustrates a network 100 (e.g., an aggregation of one or more networks of one or more different entities) operating using multiple protocol layers in processing packets (e.g., using overlay and underlay protocols/networks) according to one embodiment. As shown, network 100 includes client networks 101 and 103 (which are the same network in one embodiment) communicatively coupled to a provider network 110. In one embodiment, network 110 uses Segment Routing (SR), Multiprotocol Label Switching (MPLS), tunnels, Ethernet VPN (EVPN), Provider Backbone Bridging EVPN (PBB-EVPN), Virtual eXtensible Local Area Network (VxLAN), Virtual eXtensible Local Area Network Generic Protocol Extension (VxLAN-GPE), Generic Routing Encapsulation, Internet Protocol version 4 and/or 6 (IP), and/or other encapsulating and/or packet forwarding technology.

In one embodiment, provider network 110 includes provider edge nodes 111 and 113, and a network 112 of network nodes, gateways, service functions, hosts (e.g., end nodes), network management, operations support systems, etc. In one embodiment, provider edge nodes 111 and 113 process packets received from networks 101 and 103, which may include encapsulating or otherwise processing these packets into Segment Routing packets such as by adding a SR header (and possibly another IP header) to these packets according to a data plane ascertained Segment Routing policy, and subsequently decapsulating or removing a Segment Routing header (and possibly another IP header) and forwarding the native (e.g., IP) packets into network 101 and 103. In one embodiment, edge nodes 111 and 113 perform ingress and egress processing of packets, including adding and extracting operations data fields and operations data to packets.

In one embodiment, one or more of: node 111, node 113, and a node in network 112 is implemented in a virtualization and container environment.

Figure 1B:
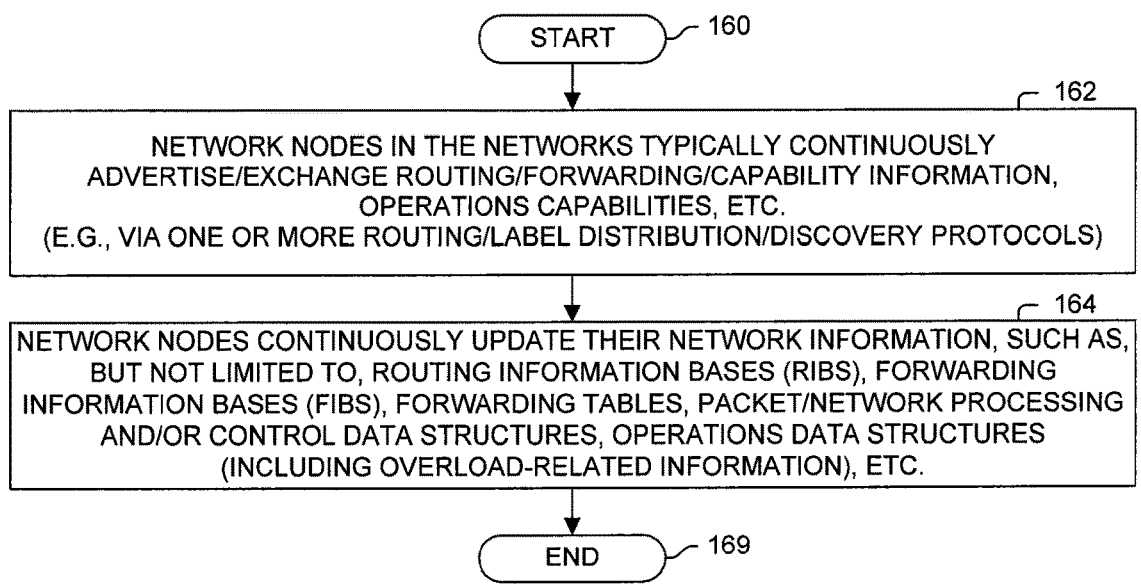
FIG. 1B illustrates a process according to one embodiment.

FIG. 1B illustrates a process according to one embodiment associated with signaling among entities of a virtualized packet processing apparatus using in-band operations data included in packets being processed. Processing begins with process block 160. In process block 162, virtualized and non-virtualized network nodes in the networks typically continuously advertise/exchange routing, forwarding, capability and information (e.g., including operations capabilities), etc., via one or more routing, label distribution, discovery, signaling and/or other control-plane protocols. In process block 164, the network nodes continuously update their network information, such as, but not limited to, Routing Information Bases (RIBs), Forwarding Information Bases (FIBS), forwarding tables, packet/network processing and/or control data structures, operations data structures, etc. Processing of the flow diagram of FIG. 1B is complete as indicated by process block 169.

Figure 2:
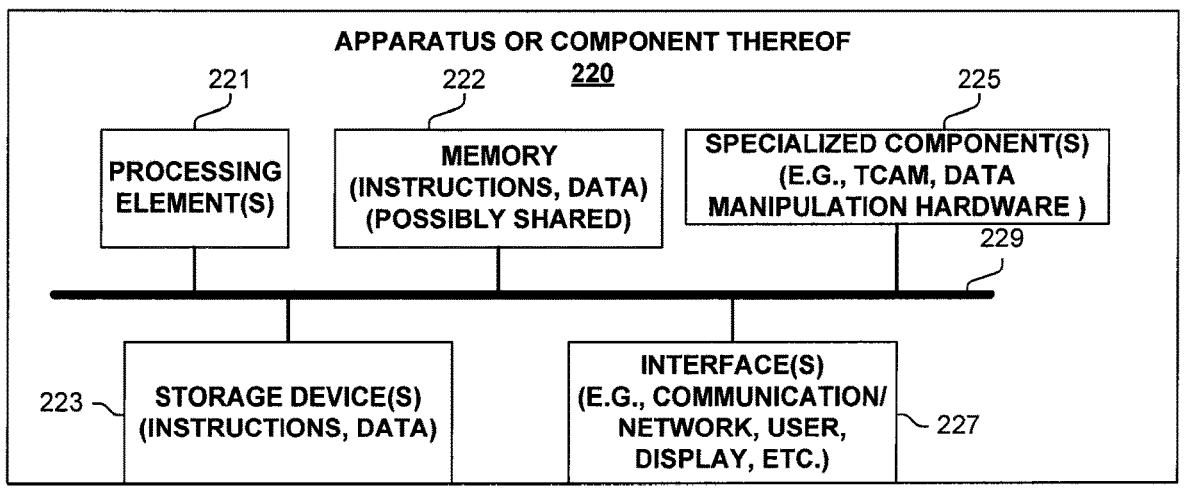
FIG. 2 illustrates an apparatus or component thereof according to one embodiment.

FIG. 2 is a block diagram of an apparatus 220 (e.g., host, router, node, destination, physical host, or portion thereof) used in one embodiment associated with signaling among entities of a virtualized packet processing apparatus using in-band operations data included in packets being processed. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including operations/IOAM processing) and/or service function operations; associative memory; binary and/or ternary content-addressable memory; Application Specific Integrated Circuit(s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
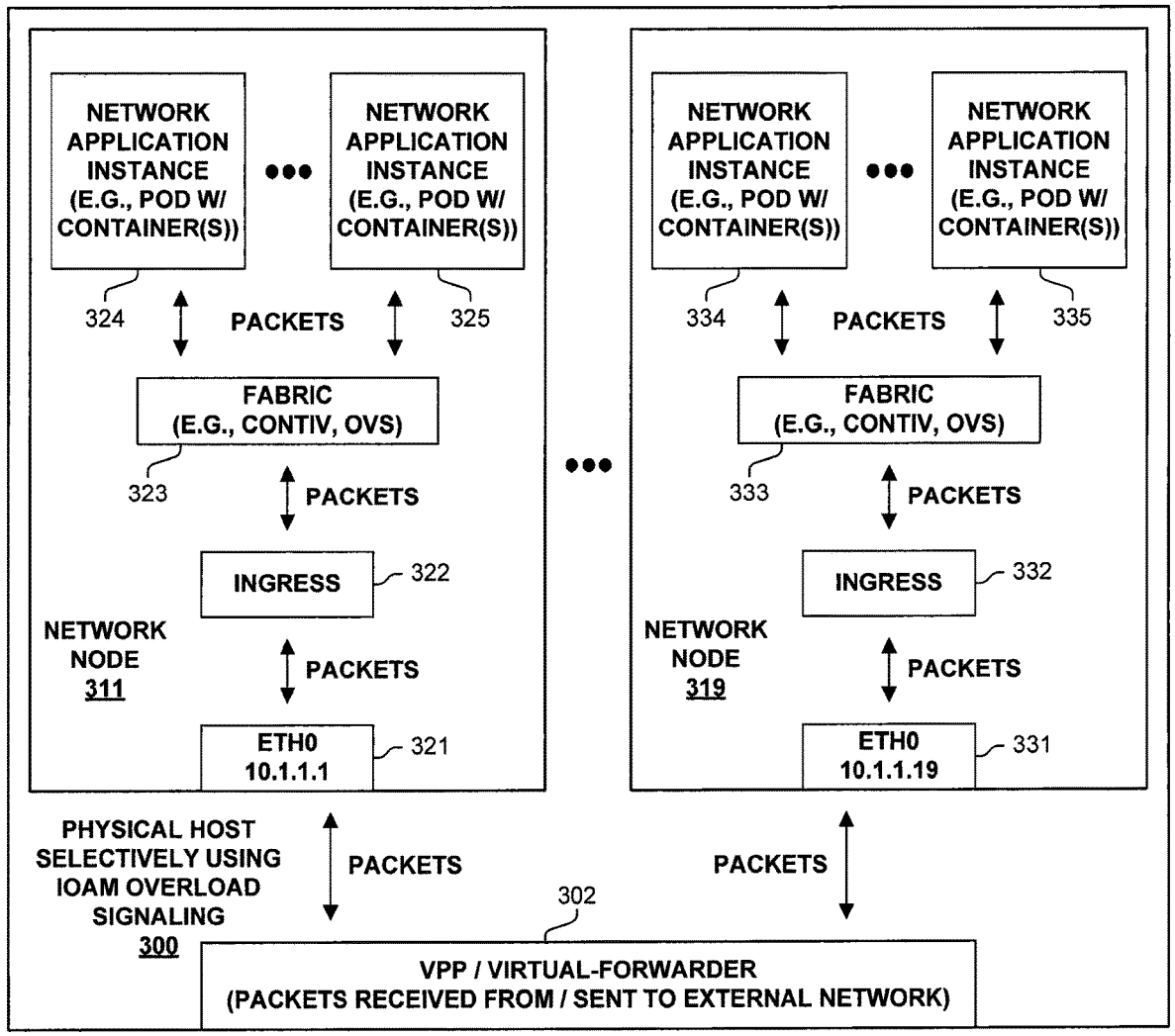
FIG. 3A illustrates a virtualized packet processing apparatus operating according to one embodiment.

FIG. 3A illustrates one embodiment that includes a virtualized packet processing apparatus implemented on a physical host 300. A packet received on Vector Packet Processor (VPP)/Virtual-Forwarder 302 from an external network traverses an ingress path to one of the network application instances (324-325, 334-335), wherein the network application is applied to the packet. The post-service applied packet then traverses an egress path back to VPP/Virtual-Forwarder 302. The virtualized packet processing apparatus uses in-band operations data (e.g., that included in an IOAM header) in a packet to signal and react to a detected overload condition related to the ingress and/or egress path taken by the packet and/or the particular network application instances (324-325, 334-335) that applied the network service to the packet.

In the virtualized packet processing apparatus, packets received by VPP/Virtual-Forward 302 from an external network are distributed (e.g., load balanced or otherwise distributed) to a network node (311-319). Within each network node 311-319 are ETH0 (321, 331), Ingress (322, 332), Fabric (e.g., CONTIV, OVS) (323, 333), and multiple network application instances (324-325, 334-335) (e.g., a POD with one or more containers that apply a network service to a packet).

The ingress and egress paths taken by a packet flow through many of the same entities. In one embodiment, anyone of these same entities adds an operations header to a packet traversing an ingress path, and removes the added operations header to the packet traversing an egress path. In response to a detected overload condition, any entity can signal to affect the processing of subsequent packets by the virtualized packet processing apparatus, including causing a load-balancing entity (e.g., VPP/Virtual-Forwarder 302, Fabric 323/333) to suspend distribution of packets towards an entity corresponding to the detected overload condition.

Figure 3B:
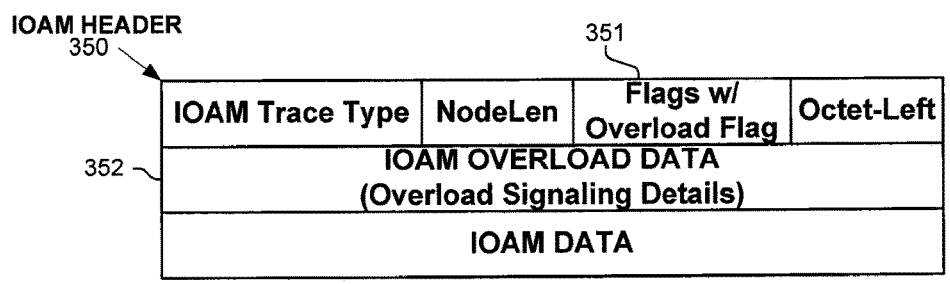
FIG. 3B illustrates an In-situ Operations, Administration, Maintenance (IOAM) header included in packets according to one embodiment.

FIG. 3B illustrates an operations header 350, and in particular, an In-situ Operations, Administration, Maintenance (IOAM) header 350 added to packets according to one embodiment. As shown, IOAM header 350 includes an Overload Flag for signaling a detected overload condition (e.g., the Overload Flag is set or cleared); and an IOAM Overload Data field 352 for storing details related to a detected overload condition.

In one embodiment, a set Overload Flag 351 in an IOAM header of a particular packet indicates that packet traversed one or more virtualized entities (e.g., instances) that is associated with a detected overload condition. Additional detailed information may be included in IOAM Overload Data field 352. In one embodiment, in response to the IOAM Overload Flag being set in a received packet or an entity setting the Overload Flag, the entity modifies the IOAM packet header 350 to specify a different trace type so that include more operations data collection is performed on the packet.

In one embodiment, an overload condition refers to an entity that is suffering from some performance or other resource related issues (e.g., an available memory or CPU resource is low, there is a traffic capacity issue).

In one embodiment, an operations header (e.g., IOAM header) is used to signal a detected "unhealthy" condition of a virtual entity (e.g., instance) which can be used by another entity to divert future traffic (e.g., divert any new flow, divert all flows, divert any new critical flow).

In one embodiment, operations data is communicated in an operations data header (e.g., IOAM header) using one or more data structures, including, but not limited to, operation data flag(s), operation data field(s)), operations, Type-Length-Value(s) (TLV's).

Figure 4A:
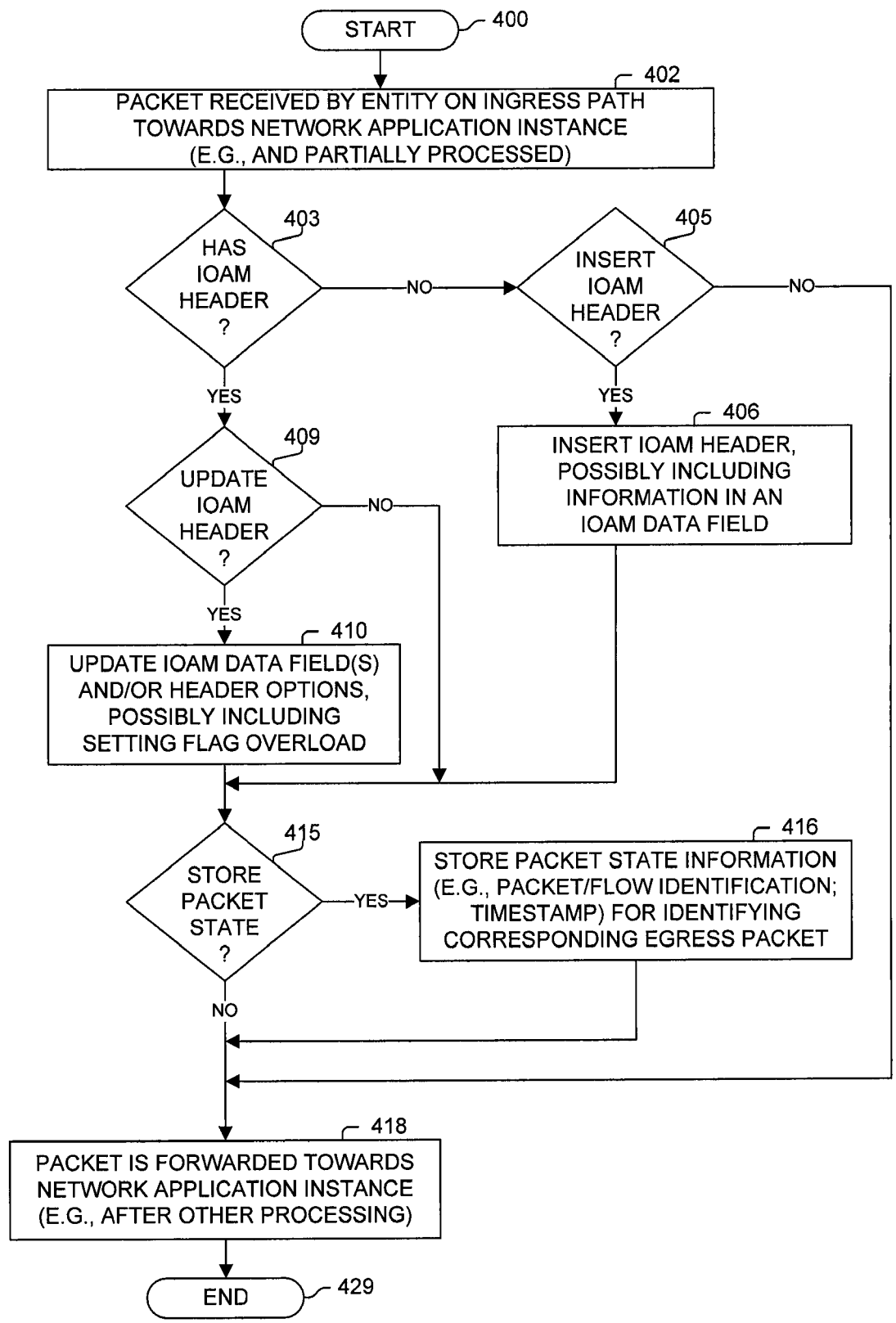
FIG. 4A illustrates a process according to one embodiment.

FIG. 4A illustrates particular operations data processing (e.g., on an ingress path) by a virtual packet processing apparatus performed in one embodiment. Processing begins with process block 400. In process block 402, a packet is received by a virtual entity (e.g., instance) on an ingress path towards a network application instance (with the received packet typically being partially, non-operations data processed). As determined in process block 403, if the received packet already has an IOAM header, then processing proceeds to process block 409; otherwise, processing proceeds to process block 405.

As determined in process block 405, if the received packet should be IOAM instrumented (e.g., in response to some performance indicia indicating a possible issue, periodically, or otherwise), then processing proceeds to process block 406; otherwise processing proceeds directly to process block 418.

In process block 406, an IOAM header is added to the received packet, possibly including information (e.g., node identification, timestamp) in an operations data field of the IOAM header. Processing proceeds to process block 415.

As determined in process block 409, if the IOAM header is to be updated, then processing proceeds to process block 409; otherwise, processing proceeds directly to process block 415.

In process block 410, the IOAM header is updated (e.g., an IOAM data field, the Overload Flag set or cleared, such as, but not limited to, in response to a detected overload condition or that there is no longer a detected overload condition). Processing proceeds to process block 415.

As determined in process block 415, if state of the packet should be stored, then processing proceeds to process block 416; otherwise, processing proceeds directly to process block 418.

In process block 416, packet state information (e.g., packet/flow identification, timestamp) is stored in the virtual entity such that it can be correlated with the egress of the packet (e.g., to determine a round-trip time, and whether it indicates to instrument future packets to investigate a possible overload condition). Processing proceeds to process block 418.

In process block 418, the packet is forwarded along the ingress path towards a corresponding network application instance (and other non-operations data processing is typically performed).

As indicated by process block 429, processing of the flow diagram of FIG. 4A is complete.

Figure 4B:
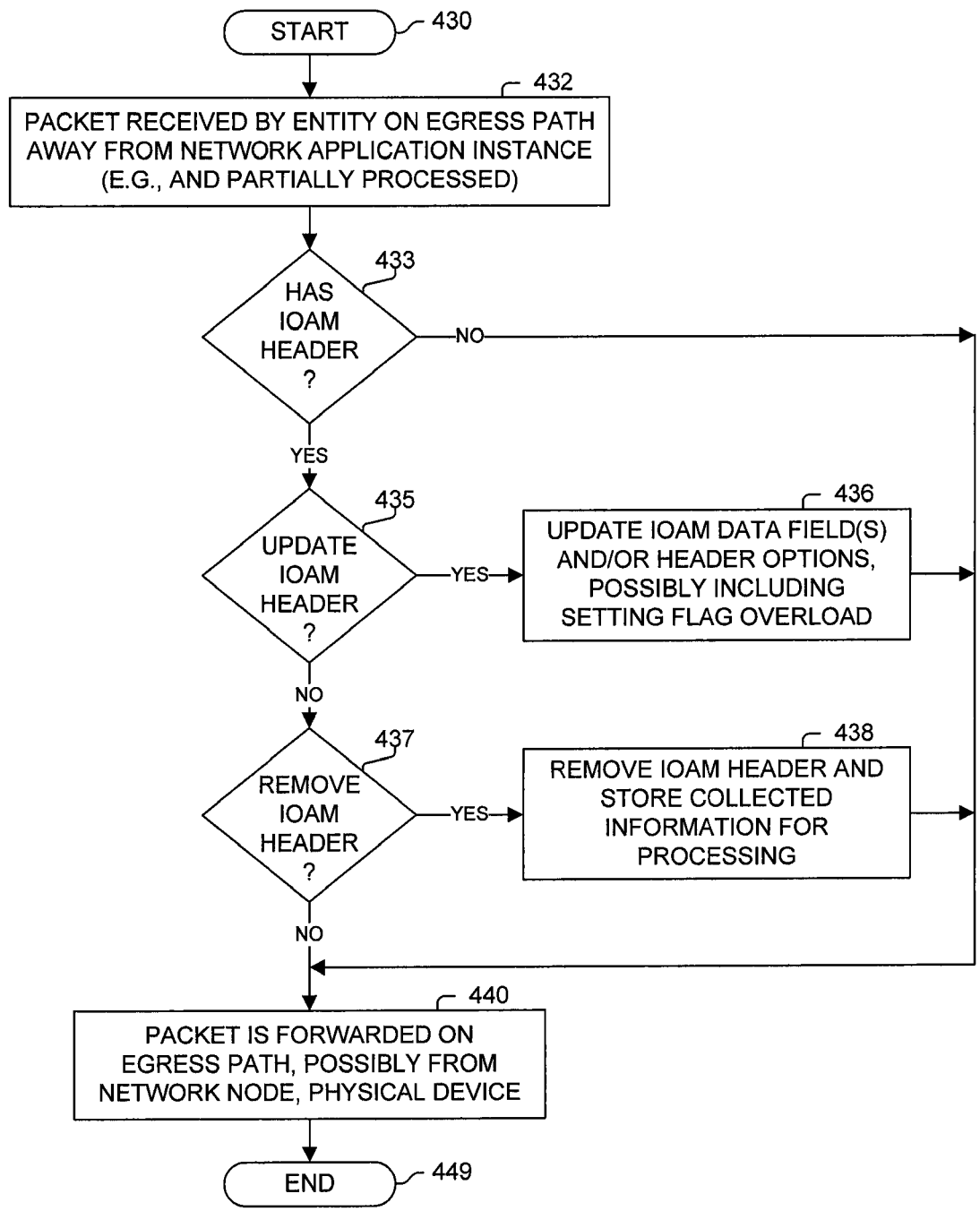
FIG. 4B illustrates a process according to one embodiment.

FIG. 4B illustrates particular operations data processing (e.g., on an egress path) by a virtual packet processing apparatus performed in one embodiment. Processing begins with process block 430. In process block 432, a packet is received by a virtual entity (e.g., instance) on an egress path away from a network application instance (with the packet typically being partially, non-operations data processed).

As determined in process block 433, if the packet has an IOAM header, then processing proceeds to process block 435; otherwise, processing proceeds directly to process block 440.

As determined in process block 435, if the IOAM header is to be updated, then processing proceeds to process block 436; otherwise, processing proceeds to process block 437.

In process block 436, the IOAM header is updated (e.g., an IOAM data field, the Overload Flag set or cleared, such as, but not limited to, in response to a detected overload condition or that there is no longer a detected overload condition). Processing proceeds directly to process block 440.

As determined in process block 437, if the IOAM packet should be removed from the packet, then processing proceeds to process block 438; otherwise processing proceeds directly to process block 440.

In process block 438, the IOAM header is removed from the packet, with the acquired operations data stored in the node for processing. Processing proceeds to process block 440.

In process block 440, the packet is forwarded along the egress path, possibly from the network node and/or physical device (and typically some non-IOAM processing is performed).

As indicated by process block 449, processing of the flow diagram of FIG. 4B is complete.

Figure 4C:
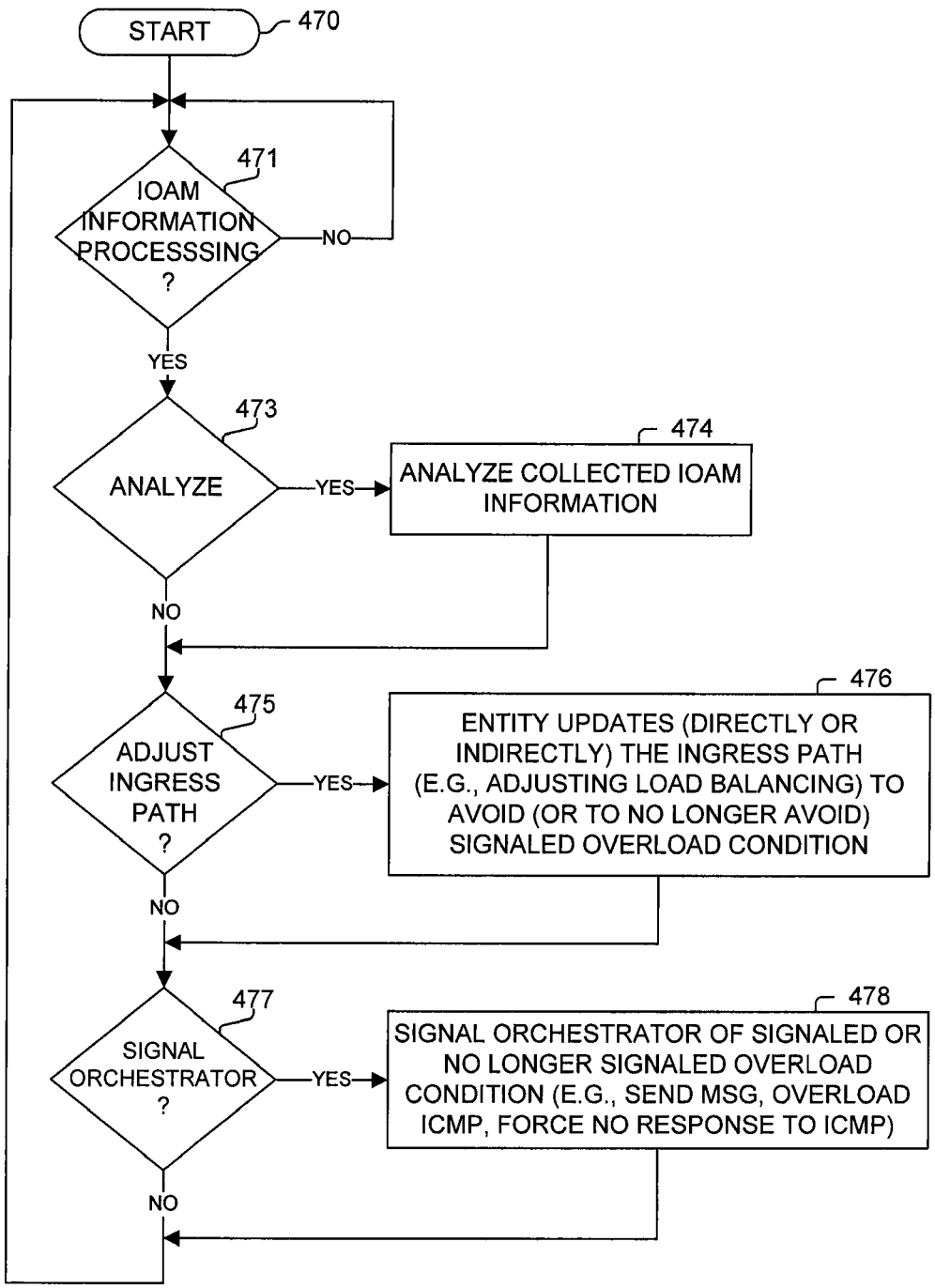
FIG. 4C illustrates a process according to one embodiment.

FIG. 4C illustrates particular operations data processing by a virtual packet processing apparatus performed in one embodiment. Processing begins with process block 470. Processing proceeds to, and remains at, process block 471 as long as there is no IOAM information processing to be performed; otherwise, processing proceeds to process block 473.

As determined in process block 473, if collected information is to be analyzed, then processing proceeds to process block 474; otherwise processing proceeds directly to process block 475.

In process block 474, collected IOAM information is processed, such as, but not limited to, determining that some action should be taken based thereon. Processing proceeds to process block 475.

As determined in process block 475, if ingress path for future packets is to be adjusted, then processing proceeds to process block 476; otherwise, processing proceeds directly to process block 477.

In process block 476, the entity updates (directly by the entity changing its forwarding configuration or indirectly by signaling to another entity) the ingress path to avoid the signaled overload condition, or not to avoid a no longer signaled overload condition. Processing proceeds to process block 477.

As determined in process block 477, if an orchestrator of the virtualization and container environment should be signaled, then processing proceeds to process block 478; otherwise, processing returns directly to process block 471.

In process block 478, the orchestrator is notified of the signaled, or no longer signaled, overload condition (e.g., via a message, including the notification in an ICMP packet, forcing a non-response to a received ICMP packet). Processing returns to process block 471.

Figure 5A:
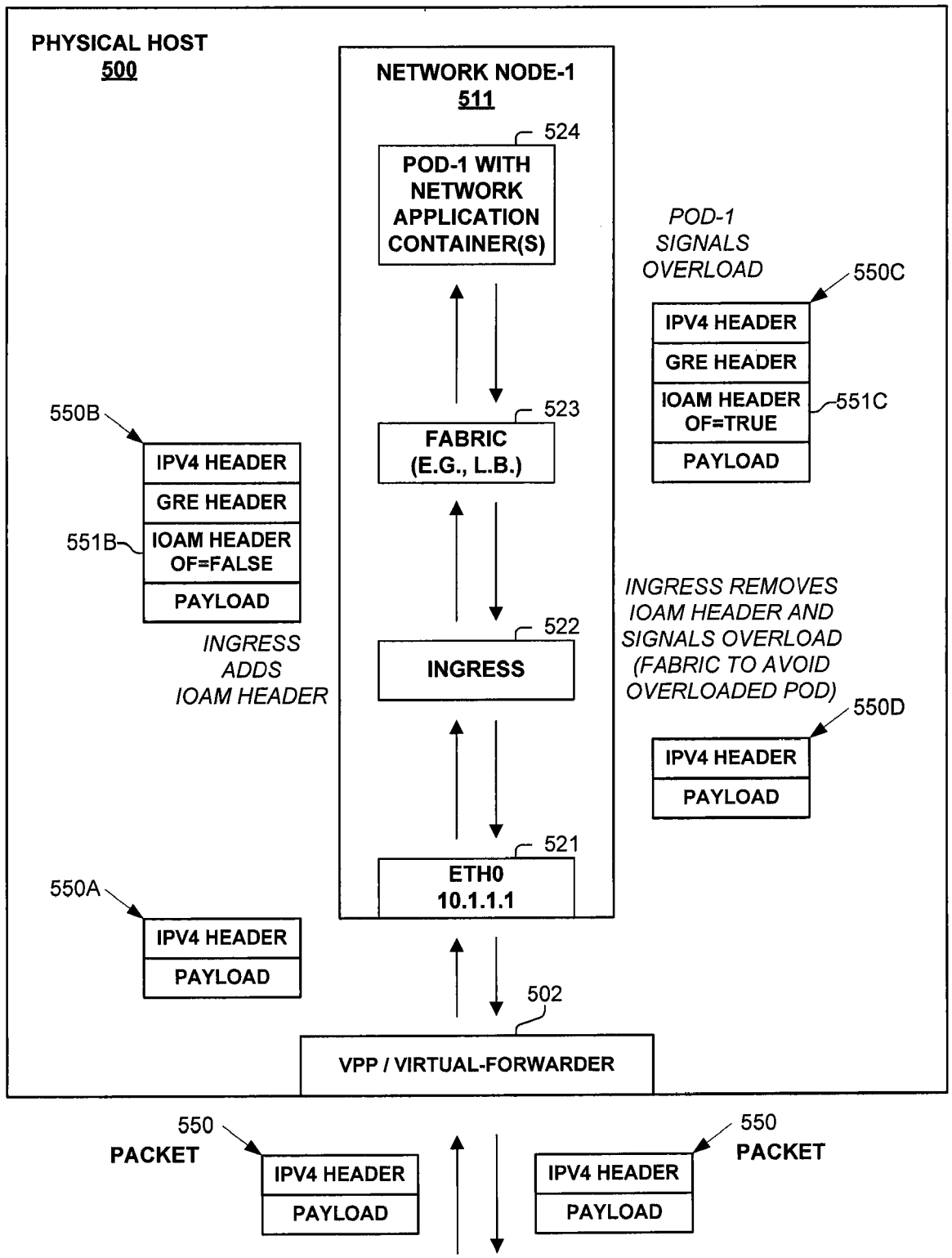
FIG. 5A illustrates a virtualized packet processing apparatus operating according to one embodiment.

FIG. 5A illustrates the operation of a virtualization and container environment operating on physical host 500 and according to one embodiment. FIG. 5A illustrates one embodiment of the virtualization and container environment shown in FIG. 3A.

In one embodiment, POD-1 (524) is suffering from some performance issues. POD-1 (524) marks the Overload Flag in the IOAM header 551C of any packet 550C that it sends on the egress path towards Ingress 522. In response to the set Overload Flag, the load balancing program on Ingress 522 is typically immediately modified (e.g., the weightage for each POD is change) to take appropriate action in response (e.g., limit the traffic, no new flows, divert all traffic). POD-1 (524) will keep sending packets with the Overload Flag set in an IOAM header as long as the issue persists. Once the issue is recovered, POD-1 (524) will send packets with a cleared Overload Flag. In response, Ingress 522 will return to including POD-1 (524) in its load balancing decision.

As shown in FIG. 5A and according to one embodiment, the virtualization and container environment operating on physical host 500 includes VPP/Virtual-Forwarder 502 (that performs load balancing among multiple network nodes), and a Network Node-1 (511), that includes ETH0 (521), Ingress 522, Fabric 523 (that performs load balancing among multiple PODS), and POD-1 (524) (including one or more application containers, one of which will apply the network service to packet 550). Packet 550 is denoted as 550, 550A, 550B, 550C, and 550D for explanation purposes as the same packet 550 traverses the embodiment of FIG. 5A.

Internet Protocol version 4 (IPv4) packet 550 is received by VPP/Virtual-Forwarder 502, which performs load balancing and sends packet 550A to ETH0 (521).

ETH0 (521) receives packet 550A, and sends packet 550A to Ingress 522.

Ingress 552 processes packet 550A, including adding IOAM header 551B with the Overload Flag set to False (and also adds a Generic Routing Encapsulation—GRE header) resulting in packet 550B, that is sent to Fabric 523.

Fabric 523 receives packet 550B and forwards packet 550B to POD-1 (524).

The network application is applied to packet 550B by a container within POD-1 (524). Also, in response to detecting an overload condition associated with POD-1 (524), POD-1 (524) sets Overload Flag in IOAM header 551C and sends packet 550C to Fabric 523.

Fabric 523 receives packet 550C and forwards packet 550C to Ingress 522.

Ingress 522 receives packet 550C, removes IOAM header 551C, and sends packet 550D to ETH0 (521). In response to the Overload Flag being set in IOAM header 551C, Ingress 522 signals this overload to Fabric 523 directly or to the Orchestrator to modify the packet distribution (e.g., load balancing) performed by Fabric 523 to avoid sending packets to POD-1 (524).

ETH0 (521) receives packet 550D and sends packet 550D to VPP/Virtual-Forwarder 502.

Virtual Forwarder receives packet 550D, and sends packet 550 onto the external network.

Figure 5B:
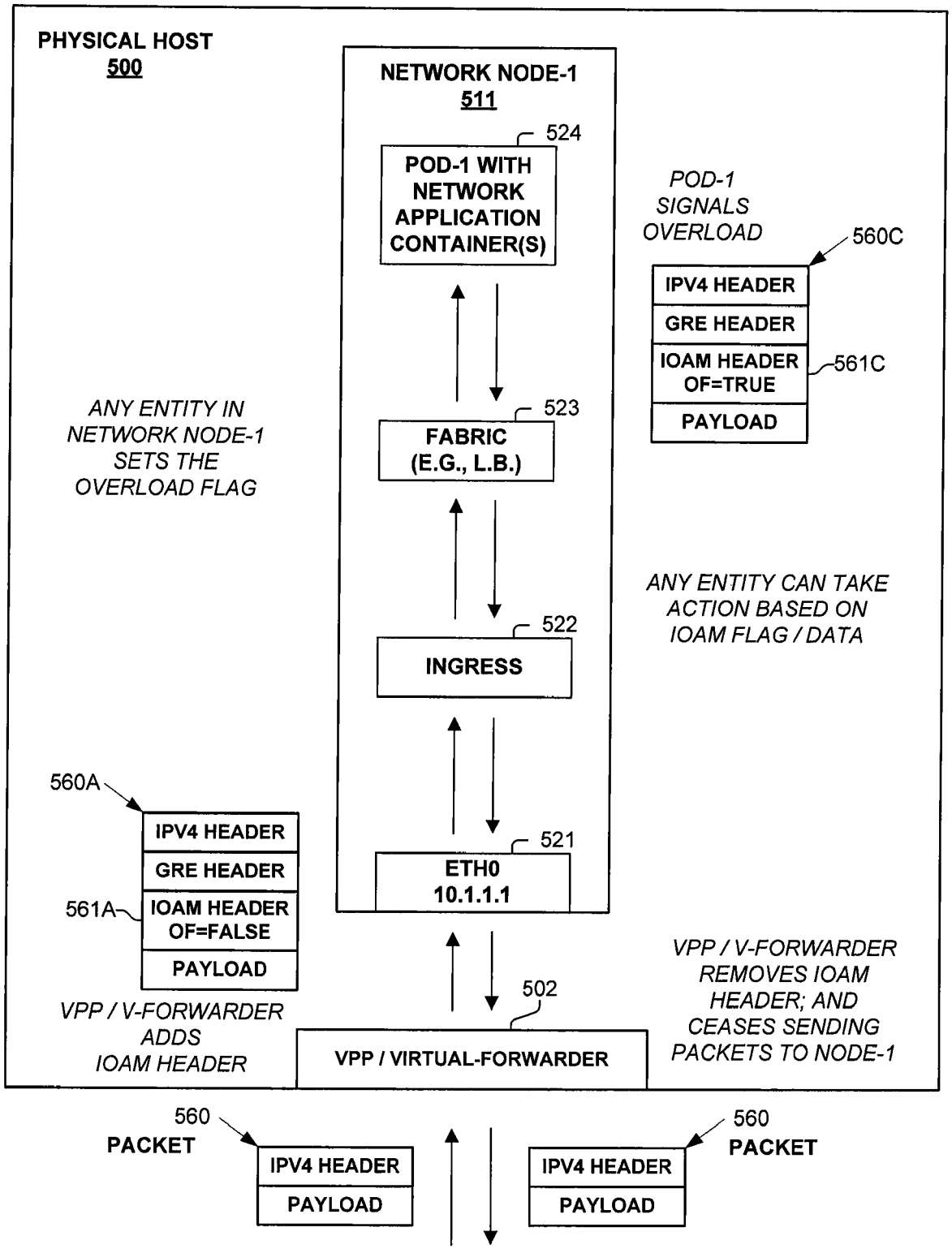
FIG. 5B illustrates a virtualized packet processing apparatus operating according to one embodiment.

FIG. 5B illustrates the operation of a virtualization and container environment operating on physical host 500 and according to one embodiment. FIG. 5B illustrates one embodiment of the virtualization and container environment shown in FIG. 3A.

In one embodiment, Node-1 (511) is suffering from some performance issues. POD-1 (524) marks the Overload Flag in the IOAM header 561C of any packet 560C that it sends on the egress path towards VPP/Virtual Forwarder 502. In response to the set Overload Flag, VPP/Virtual Forwarder 502 triggers relevant action to avoid forwarding packet traffic to affected Node-1 (511). POD-1 (524) will keep sending packets with the Overload Flag set in an IOAM header as long as the issue persists. Once the issue is recovered, POD-1 (524) will send packets with a cleared Overload Flag. In response, VPP/Virtual Forwarder 502 will return to including Node-1 (511) in its load balancing decision. In one embodiment, VPP/Virtual Forwarder 502 signals to the Source Address of externally received packets about the corresponding overload condition so that the packet source will send packets to a different Destination Address (e.g., not associated with the detected overload condition).

As shown in FIG. 5B and according to one embodiment, the virtualization and container environment operating on physical host 500 includes VPP/Virtual-Forwarder 502 (that performs load balancing among multiple network nodes), and a Network Node-1 (511), that includes ETH0 (521), Ingress 522, Fabric 523 (that performs load balancing among multiple PODS), and POD-1 (524) (including one or more application containers, one of which will apply the network service to packet 560). Packet 560 is denoted as 560, 560A, and 560C, for explanation purposes as the same packet 560 traverses the embodiment of FIG. 5B.

Internet Protocol version 4 (IPv4) packet 560 is received by VPP/Virtual-Forwarder 562, which processes packet 560, including adding IOAM header 561A with the Overload Flag set to False (and also adds a Generic Routing Encapsulation—GRE header) resulting in packet 560A, that is sent to ETH0 (521).

Packet 560A is sent through ETH0 (521), Ingress 522, Fabric 523, and POD-1 (524); and the network application is applied to packet 560A by a container within POD-1 (524).

In one embodiment, any of these entities can set the Offload Flag to indicate an overload condition within node-1 (511). In the processing shown in FIG. 5B, one or more of these entities ETH0 (521), Ingress 522, Fabric 523, and POD-1 (524) sets the Overload Flag in IOAM header, such that packet 560C includes set Overload Flag in IOAM header 561C of packet 560C.

Packet 560C is sent through the egress path of Fabric 523, Ingress 522, ETH0 (521) to VPP/Virtual-Forwarder 502. In one embodiment, any of these entities can take action based on the status of Overload Flag (and/or other operations data) in IOAM header 561C of packet 560C.

VPP/Virtual-Forwarder 502 receives packet 560C, removes IOAM header 561C, and sends packet 560 into the external network. In response to the Overload Flag being set in IOAM header 561C, VPP/Virtual-Forwarder 502 adjusts its forwarding directly or by signaling to the Orchestrator to modify the packet distribution (e.g., load balancing) performed by VPP/Virtual-Forwarder 502 to avoid sending packets to Node-1 (511).

Figure 6:
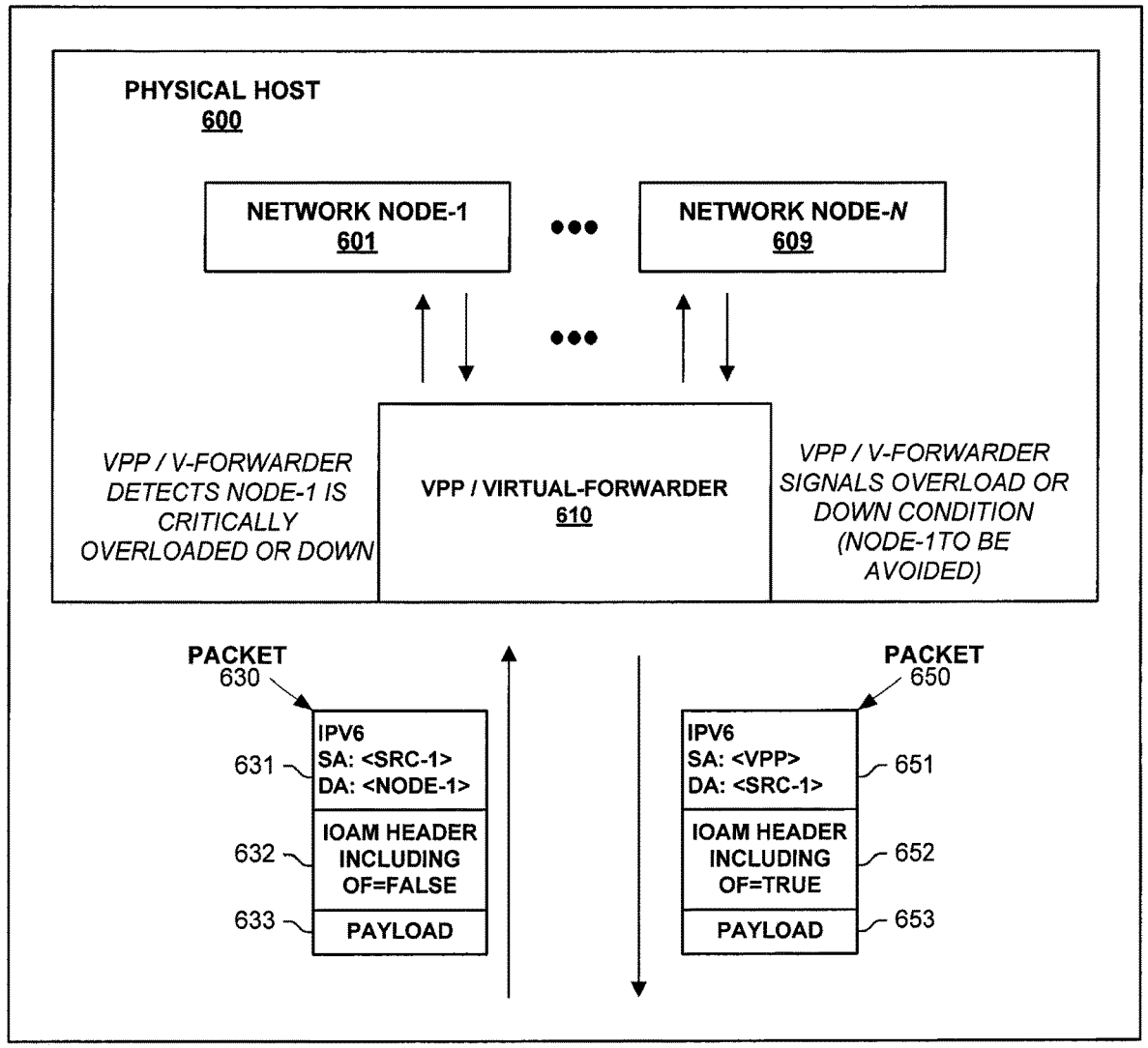
FIG. 6 illustrates a virtualized packet processing apparatus operating according to one embodiment.

FIG. 6 illustrates the operation of a virtualization and container environment operating on physical host 600 and according to one embodiment. FIG. 6 illustrates one embodiment of the virtualization and container environment shown in FIG. 3A.

As shown in FIG. 6, the virtualization and container environment operating on physical host 600 includes VPP/Virtual-Forwarder 610, that performs load balancing among multiple (N in number) network nodes 601-609.

In one embodiment, VPP/Virtual-Forwarder 610 detects that Node-1 (601) is critically overloaded or down. In response, VPP/Virtual-Forwarder 610 is configured to not send packets to Node-1 (601), and typically signals an orchestrator accordingly.

In one embodiment, VPP/Virtual-Forwarder 610 receives packet 630, that includes an IPv6 header (631), IOAM header including Overflow Flag set to False (632) and payload 633. IPv6 header 631 includes a Destination Address associated with Node-1 (601).

In response to its current state not to forward packets to Node-1 and its forwarding information that packet 630's Destination Address is within Node-1, VPP/Virtual-Forwarder 610 creates and sends packet 650 into the external network. As shown, packet 650 includes an IPv6 header 651 that includes a Source Address of VPP/Virtual-Forwarder 610 and a Destination Address of the Source Address of received packet 630. packet 650 also includes IOAM header with the Overload Flag set to True; and payload 653 (e.g., copied payload 633 of received packet 630).

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    after receiving a particular packet by a particular virtual entity of a virtual packet processing apparatus, the particular virtual entity adding an operations header to the particular packet;
    receiving, by a second virtual entity of the packet processing apparatus, the particular packet with said operations header;
    modifying, by the second virtual entity, said operations header to indicate an overload condition of a corresponding overloaded virtual entity;
    in response to said indicated overload condition, adjusting the packet processing apparatus to avoid sending packets to said corresponding overloaded virtual entity; and
    after receiving the particular packet with said operations header indication the overload condition, the particular virtual entity forwarding the particular packet with the operations header removed;
    wherein the particular virtual entity is an Ingress; and
    wherein said adjusting the packet processing apparatus to avoid sending packets to said corresponding overloaded virtual entity includes modifying a load-balancing entity.

2. The method of claim 1, wherein said operations header is an In-Situ Operations, Administration, and Maintenance (IOAM) header.

3. The method of claim 2, wherein the IOAM header includes an Overload Flag; and wherein modifying said operations header to indicate the overload condition includes setting or clearing the Overload Flag.

4. The method of claim 1, wherein the load-balancing entity is a fabric.

5. A method, comprising:
    after receiving a particular packet by a particular virtual entity of a virtual packet processing apparatus, the particular virtual entity adding an operations header to the particular packet;
    receiving, by a second virtual entity of the packet processing apparatus, the particular packet with said operations header;
    modifying, by the second virtual entity, said operations header to indicate an overload condition of a corresponding overloaded virtual entity;
    in response to said indicated overload condition, adjusting the packet processing apparatus to avoid sending packets to said corresponding overloaded virtual entity; and
    after receiving the particular packet with said operations header indication the overload condition, the particular virtual entity forwarding the particular packet with the operations header removed;
    wherein the particular entity is a virtual forwarder; and
    wherein said adjusting the packet processing apparatus to avoid sending packets to said corresponding overloaded virtual entity includes modifying forwarding information in the virtual forwarder.

6. A method, comprising:
    after receiving a particular packet by a particular virtual entity of a virtual packet processing apparatus, the particular virtual entity adding an operations header to the particular packet;
    receiving, by a second virtual entity of the packet processing apparatus, the particular packet with said operations header, with said operations header being an In-Situ Operations, Administration, and Maintenance (IOAM) header;
    modifying, by the second virtual entity, said operations header to indicate an overload condition of a corresponding overloaded virtual entity, with said modifying including updating an IOAM data field of the IOAM header with one or more details related to the overload condition;
    in response to said indicated overload condition, adjusting the packet processing apparatus to avoid sending packets to said corresponding overloaded virtual entity; and
    after receiving the particular packet with said operations header indication the overload condition, the particular virtual entity forwarding the particular packet with the operations header removed.

7. A method, comprising:
    after receiving a particular packet by a particular virtual entity of a virtual packet processing apparatus, the particular virtual entity adding an operations header to the particular packet;
    receiving, by a second virtual entity of the packet processing apparatus, the particular packet with said operations header;
    modifying, by the second virtual entity, said operations header to indicate an overload condition of a corresponding overloaded virtual entity;
    in response to said indicated overload condition, signaling the overload condition of the corresponding overloaded virtual entity to an orchestrator of the virtual packet processing apparatus with the packet processing apparatus being adjusted to avoid sending packets to said corresponding overloaded virtual entity; and after receiving the particular packet with said operations header indication the overload condition, the particular virtual entity forwarding the particular packet with the operations header removed.

8. A virtualized packet processing apparatus implemented on a physical host, with the virtualized packet processing apparatus, comprising: one or more processing elements; memory; and one or more interfaces sending and receiving packets with a network; wherein the virtualized packet processing apparatus performs operations, including:

after receiving a particular packet by a particular virtual entity of a virtual packet processing apparatus, the particular virtual entity adding an operations header to the particular packet;

receiving, by a second virtual entity of the packet processing apparatus, the particular packet with said operations header;

modifying, by the second virtual entity, said operations header to indicate an overload condition of a corresponding overloaded virtual entity;

in response to said indicated overload condition, adjusting the packet processing apparatus to avoid sending packets to said corresponding overloaded virtual entity; and after receiving the particular packet with said operations header indication the overload condition, the particular virtual entity forwarding the particular packet with the operations header removed;

wherein the particular virtual entity is an Ingress; and wherein said adjusting the packet processing apparatus to avoid sending packets to said corresponding overloaded virtual entity includes modifying a load-balancing entity.

9. The virtualized packet processing apparatus of claim 8, wherein said operations header is an In-Situ Operations, Administration, and Maintenance (IOAM) header.

10. The virtualized packet processing apparatus of claim 9, wherein the IOAM header includes an Overload Flag; and wherein modifying said operations header to indicate the overload condition includes setting or clearing the Overload Flag.

11. The virtualized packet processing apparatus of claim 8, wherein the load-balancing entity is a fabric.

12. A virtualized packet processing apparatus implemented on a physical host, with the virtualized packet processing apparatus, comprising: one or more processing elements; memory; and one or more interfaces sending and receiving packets with a network; wherein the virtualized packet processing apparatus performs operations, including:

after receiving a particular packet by a particular virtual entity of a virtual packet processing apparatus, the particular virtual entity adding an operations header to the particular packet;

receiving, by a second virtual entity of the packet processing apparatus, the particular packet with said operations header;

modifying, by the second virtual entity, said operations header to indicate an overload condition of a corresponding overloaded virtual entity;

in response to said indicated overload condition, adjusting the packet processing apparatus to avoid sending packets to said corresponding overloaded virtual entity; and after receiving the particular packet with said operations header indication the overload condition, the particular virtual entity forwarding the particular packet with the operations header removed;

wherein the particular entity is a virtual forwarder; and wherein said adjusting the packet processing apparatus to avoid sending packets to said corresponding overloaded virtual entity includes modifying a load-balancing entity different than the virtual forwarder.

* * * * *